United States Patent [19]
Standing

[11] 3,933,086
[45] Jan. 20, 1976

[54] APPARATUS FOR SEPARATING DRIED FRUIT AGGREGATES

[75] Inventor: Charles N. Standing, Minneapolis, Minn.

[73] Assignee: The Pillsbury Company, Minneapolis, Minn.

[22] Filed: Aug. 2, 1973

[21] Appl. No.: 385,006

[52] U.S. Cl............... 99/646 R; 222/272; 241/159; 241/227
[51] Int. Cl.². ........................................ B07B 13/00
[58] Field of Search...... 99/484, 485, 537, 623–625, 99/646 R, 575; 209/79, 80, 86, 75, 108; 241/152 R, 159, 227; 222/271, 272

[56] References Cited
UNITED STATES PATENTS

| | | | |
|---|---|---|---|
| 2,986,348 | 5/1961 | Noll et al. | 241/227 |
| 3,473,659 | 10/1969 | Bertkevich et al. | 209/108 |
| 3,491,952 | 1/1970 | Krolopp | 241/159 |
| 3,504,621 | 4/1970 | Qualheim | 241/159 |
| 3,622,083 | 11/1971 | Greenwald, Jr. | 241/227 |

FOREIGN PATENTS OR APPLICATIONS

| | | | |
|---|---|---|---|
| 720,190 | 4/1942 | Germany | 241/159 |
| 560,886 | 1944 | United Kingdom | 241/159 |

Primary Examiner—Richard E. Aegerter
Assistant Examiner—Stuart S. Levy
Attorney, Agent, or Firm—James V. Harmon; Michael D. Ellwein

[57] ABSTRACT

An apparatus is described for separating blocks of dried fruit composed of individual fruit pieces such as raisins which are bonded or cohered to one another. One or more pairs of rotating high friction surfaces, such as rolls having rubber projections on their surfaces, are mounted on a framework such that the fruit pieces pass between the surface pairs, being conducted downward sequentially through the pairs when more than one pair is employed, and are separated into individual fruit pieces by the action of the differential speed of the surfaces.

3 Claims, 3 Drawing Figures

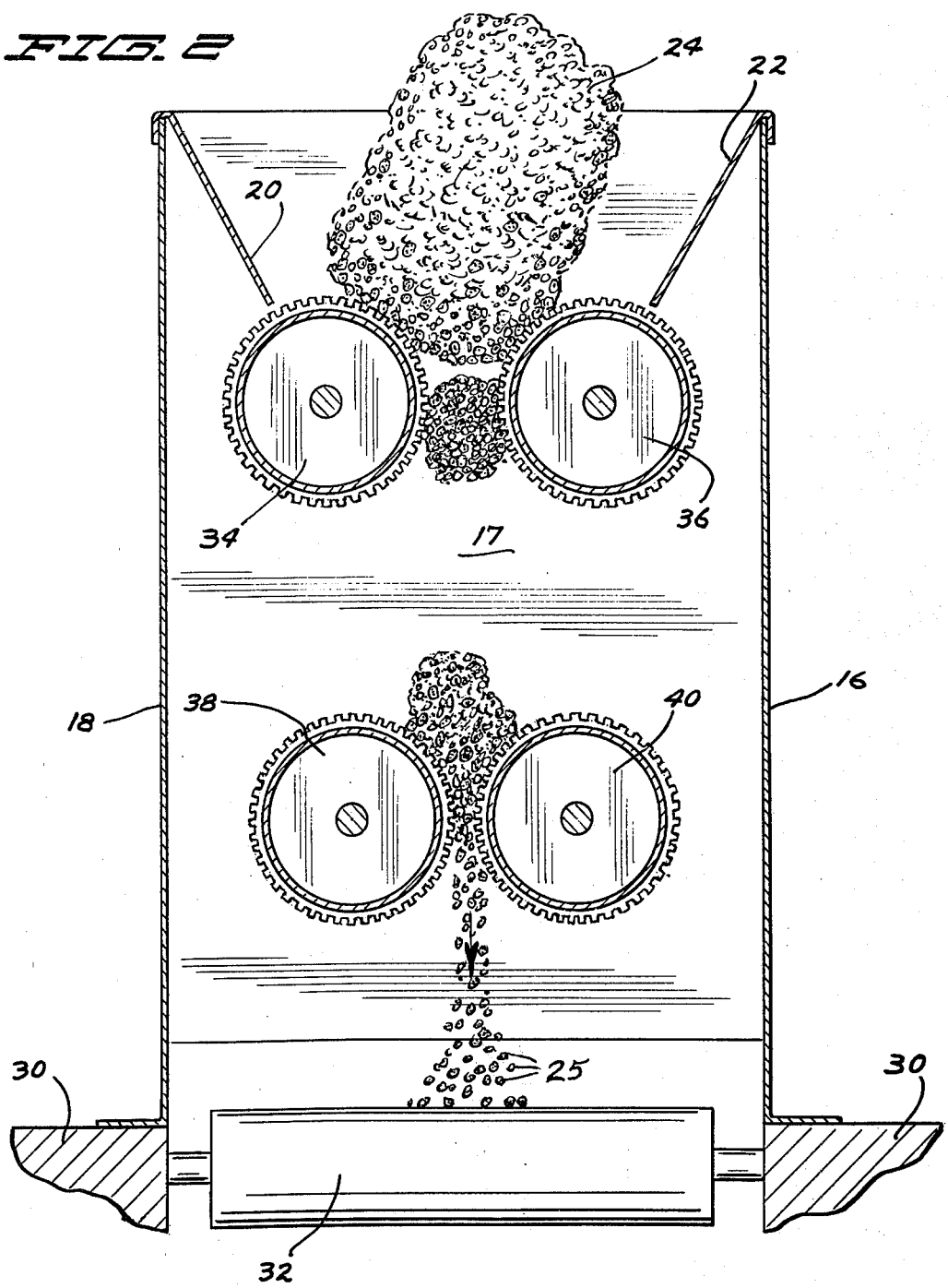
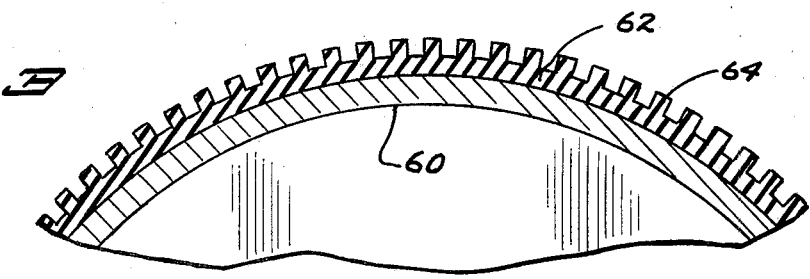

APPARATUS FOR SEPARATING DRIED FRUIT AGGREGATES

FIELD OF THE INVENTION

The invention relates to fruit handling and particularly dried fruit separation.

THE PRIOR ART

The invention has as its general purpose the efficient separation of large e.g. 30 pound blocks of dried or sticky fruit such as raisins into individual raisins at the rate of about 100–300 pounds per minute without macerating or otherwise damaging the individual pieces. One method previously employed was to soak the blocks in water, but the added 1% – 5% moisture that results from this procedure is unsatisfactory in some end products. As a result, hand separation has been resorted to in spite of its slowness, high labor cost and inefficiency. Moreover, hand separation has a tendency to produce a substantial number of small clumps.

THE OBJECTS

The general objects of the invention are: (a) to provide an apparatus for separating aggregates of dried fruit without wetting, heating, chemically modifying or contaminating the product, (b) the ability to separate the raisins efficiently at rates of from at least about 100 –300 pounds per minute, (c) the ability to produce virtually all single fruit pieces, (d) to separate the fruit pieces without injuring or macerating them, (e) the optional capacity to feed the fruit to other processing equipment at a uniform rate thereby functioning as a metering device for continuous processing, and (f) to separate the aggregates into individual pieces in one or more stages.

THE FIGURES

FIG. 2 is a cross-sectional view taken on line 2—2 of FIG. 1.

FIG. 3 is an enlarged partial sectional view of one of the rolls.

SUMMARY OF THE INVENTION

Figure 1:
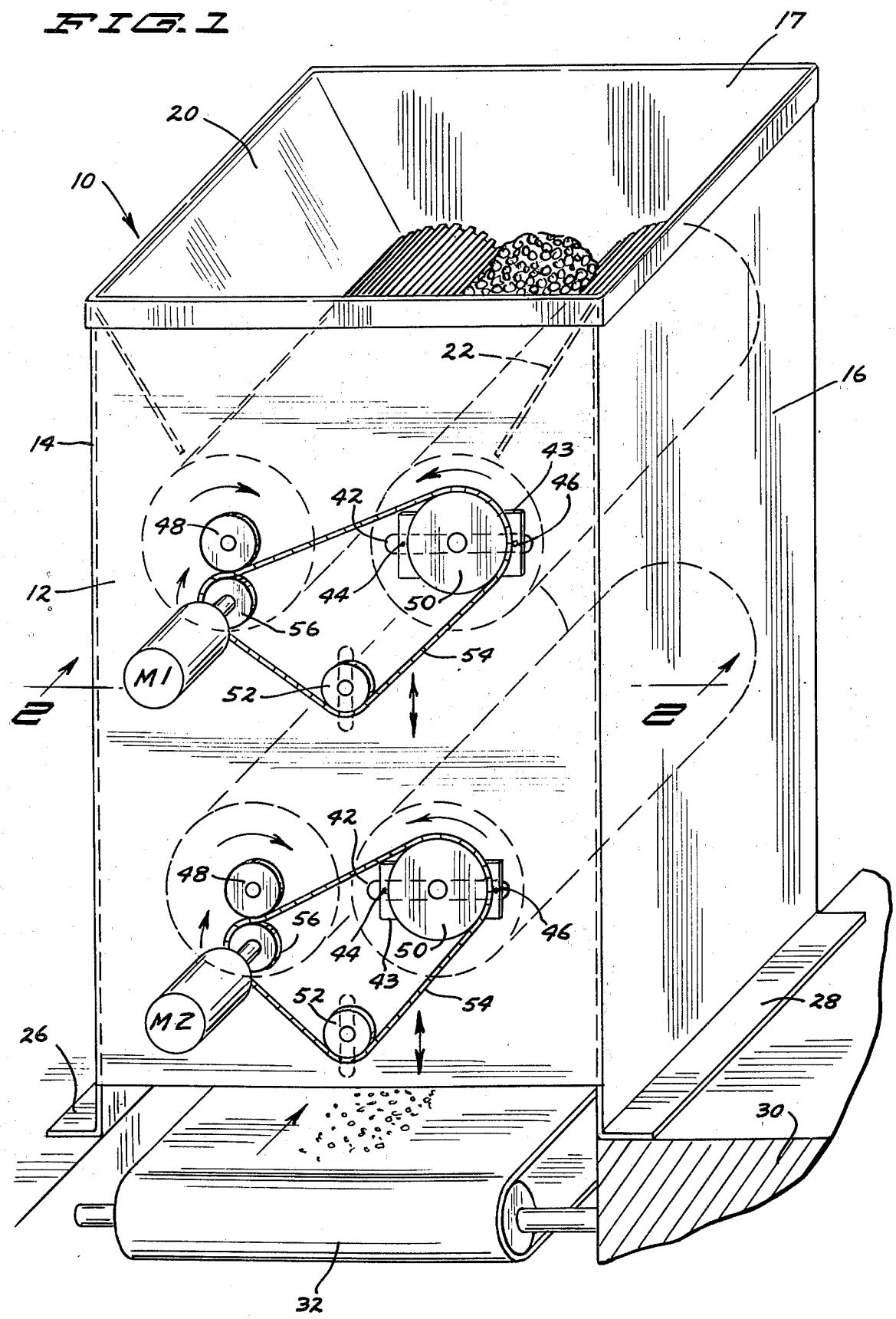
FIG. 1 is a perspective view of an apparatus embodying the invention.

An apparatus is provided for separating dried or sticky individual fruit pieces from blocks of aggregated fruit pieces. One or more pairs of movable abrading surfaces are mounted on an appropriate framework. At least one of the abrading surfaces has high friction characteristics to provide a high coefficient of friction with the block of dried fruit such that the block of fruit is abraded without cutting or macerating the individual fruit pieces. These abrading surfaces are mounted on a framework for movement in the same direction along a path converging toward a zone of minimum clearance and thereafter away from the zone of minimum clearance. A drive means is provided to impart motion to the abrading surfaces so that each surface moves in the same direction through to the zone of minimum clearance but at a different speed. The blocks placed between the abrading surfaces are subjected to shearing forces which are sufficient to deaggregate the block into individual fruit pieces. The minimum clearance between abrading surfaces is from about one half to two times the diameter of the individual fruit pieces and preferably is about the same as the diameter of the individual fruit pieces.

A hopper wall or other guide is preferably provided above the abrading surfaces for keeping the blocks centered between them and gravity is preferred for forcing the blocks into the nip. The speed differential can be provided in any suitable way, for example, by driving rolls of equal size at different speeds using gears or sprockets of different sizes or, in the alternative, rolls can be driven at the same rotational speed if they are of different diameters to provide the needed surface speed differential.

DESCRIPTION OF A PREFERRED EMBODIMENT

Refer now to FIGS. 1, 2 and 3 which illustrate a deaggregating apparatus indicated generally by the numeral 10 including a supporting framework in the form of a rectangular housing 12 having four vertically disposed sidewalls 14, 16 17 and 18 secured together by welding. At the upper end of the framework is provided a hopper or guide defined by two downwardly and centrally inclined plates 20 and 22 which help to keep blocks 24 of aggregated dried fruit such as dried raisins 25 centered between the abrading surfaces to be described below. The housing 12 is mounted by flanges 26 and 28 at its lower end upon a base 30 above a takeaway conveyor 32.

Mounted for rotation upon the framework are two pairs of vertically aligned horizontally spaced transversely extending parallel rolls 34, 36 and 38, 40 the first two of which carry out the first stage of the deaggregating operation and the second two of which perform the second stage of the deaggregating operation. The rolls 34, 36 are mounted at their ends in suitable journal bearings supported on the housing 12 only two of which are shown, the bearing 43 of roll 36 and the bearing 43 of roll 40. The bearings 43 for the roll 36 are mounted at each end in a laterally extending slot 42 provided for the purpose of allowing spacing adjustment between the roll pair 34 and 36 by tightening releasable fasteners such as bolts 44, 46 to securely retain the bearing block 43 and an indentical bearing block (not shown) at the opposite end of roll 36 in its selected position.

The rolls 34, 36 are provided with drive sprockets 48 and 50 respectively and an idler sprocket 52 is mounted for vertical adjustment to allow the tension to be adjusted in a drive chain 54 entrained around idler sprocket 52, sprocket 50 and engaging the lower edge of sprocket 48. The chain 54 is also entrained over drive sprocket 56 which is mounted on the shaft of a drive motor M1. The drive chain and sprockets for the lower set of rolls 38 and 40 are identical to those for the upper set and the same numerals have been used for the identical parts except for the drive motor which is designated M2.

The surface configuration of each roll 34, 36–38 and 40 can be best seen in FIG. 3. Each roll has a steel wall 60 with a surface layer of an elastic material such as rubber bonded thereto. The rubber layer 62 is provided with a series of surface irregularities 64, in this case ribs extending longitudinally of the roll and perpendicular to the direction in which the roll surfaces travel. The ribs are in this example one quarter of an inch between centers and have dimensions of ⅛ in. × ⅛ in. as seen in cross-section. The ribs thus give the rolls high friction characteristics and at the same time make the surface elastic thereby virtually eliminating a chance for the raisins to be torn apart or otherwise injured.

In a typical application, the zone of minimum clearance between the rolls i.e. the nip or rolls 34, 36 if from 1 to 6 inches and between the lower pair 38 and 40 the nip is about ⅜ in. in width. It will be seen that the difference in the size of the sprockets produces speed differential between the rolls in the same set. With the speed of roll 34 from 20–50 rpm., the speed of roll 36 will typically be about 100–250 rpm. When the lower roll 38 is set to run at 30–40 rpm. the roll 40 is run at about 150–200 rpm.

During operation, as best seen in FIG. 2, the large blocks placed in the hopper between the plates 20, 22 will be deaggregated due to the abrasion produced by the differential speed of the rolls 34, 36 and the smaller pieces which fall between these rolls will be reduced to individual raisins by the shearing forces produced by rolls 38 and 40.

The abrading surfaces can take a number of different forms. They can, for example, comprise rubber belts entrained over spaced apart roll sets. One belt can be entrained over a pair of parallel rolls mounted at the same elevation. A second pair of rolls having a similar belt entrained thereover can be mounted parallel to one another and at the same elevation as the first two rolls. In this instance the zone of minimum clearance i.e. the nip between the belts, would be at a point located intermediate the two center rolls.

In another form of the invention, the abrading surfaces are formed from woven, open mesh screen coated if necessary or desirable with an elastomeric material to prevent injury that might be caused to the dried fruit pieces. The screens, when used, can be mounted in the same manner as the belts described above. In all cases, one of the abrading surfaces is driven at a faster surface speed than the other to create a speed differential so that one side of the block is retarded somewhat with respect to the other side thereby establishing a shearing force within the block.

The invention will be better understood by reference to the following examples.

EXAMPLE I

Midget raisin aggregates provided in 30 pound blocks are deaggregated in one step by passage through a single set of rolls similar to the top set in FIGS. 1 and 2 with the clearance between the rolls set at about ⅜ in., and both rolls having a diameter of 6 inches. One roll is run at 30 rpm. while the other is run at 150 rpm. The operation produces single raisins, virtually none of which are macerated.

EXAMPLE II

Select raisins (approximately 1150 raisins per pound) are provided in 30 pound blocks, two pairs of 6 in. diameter rolls are provided as in FIGS. 1 and 2. The nip of the top pair is set at 2 and ¼ in. and the rolls are run at the rate of 7 rpm. and 35 rpm. The lower pair has a clearance of ⅜ in. One is rotated at 30 rpm. and the other at 150 rpm. The center distance between the top and the bottom rolls is 11 in. Single raisins without injuries are produced as in Example I.

EXAMPLE III

Aggregated dates are separated as in Example II except that the first set of rolls has a clearance of 4 in. and the second has a clearance of 1 inch.

Example IV

Apricots are separated in the same manner as the dates in Example III.

EXAMPLE V

Currants are separated the same as in Example II.
What is claimed is:
1. An apparatus for separating blocks of aggregated dried fruit into individual food pieces comprising:
 a. a supporting framework,
 b. a pair of parallel deaggregating rolls mounted upon the framework,
 c. the surfaces of both the deaggregating rolls being formed from rubber,
 d. substantially uniformly spaced apart rubber projections over substantially the entire surface of each of the rolls of the pair,
 e. the projections being integral with each of the roll surfaces,
 f. the height and width of the projections being less than an inch,
 g. the space between the projections being on the same order as the width thereof,
 h. the rubber projections frictionally engaging the dried fruit pieces on the surface of the aggregate,
 i. the deaggregating rolls being mounted on the framework for rotation in opposite directions such that points on the surfaces move toward one another and thereafter away from one another through a zone of minimum clearance between the rolls,
 j. the width of the clearance zone between the rolls being from about 1/2 to 2 times the average diameter of the food pieces,
 k. a drive means operatively connected to both of the rolls to impart rotation thereto in opposite directions and at different surface speeds such that a speed differential is established therebetween to provide a shearing action upon the fruit,
 l. the blocks of aggregated fruit upon being placed on the rolls between the surfaces being thereby subjected to shear forces sufficient to reduce the aggregated blocks into individual fruit pieces as the rolls rotate thereby separating the fruit aggregate into individual fruit pieces without macerating or otherwise damaging the fruit pieces.
2. The apparatus of claim 1 wherein the rolls comprise the top pair of a plurality of vertically spaced pairs of rolls and the clearance between the rolls of each pair of rolls decreases proceeding from the top pair to each subsequent lower pair and the rolls of each pair are driven in opposite directions to receive the fruit from the next higher pair and carry it downwardly.
3. The apparatus of claim 1 wherein the projections are formed from rubber that are provided upon the abrading surfaces to increase the coefficient of friction between the abrading surfaces and the blocks of dried fruit without injuring them, the ribs extend perpendicular to the direction of movement of the surface and the abrading surfaces comprise two vertically disposed pairs of cooperating rolls positioned one above the other with the clearance between the upper being wider than the clearance between the lower pair.

* * * * *